(12) United States Patent
Gagel

(10) Patent No.: US 9,001,186 B2
(45) Date of Patent: Apr. 7, 2015

(54) METHOD AND DEVICE FOR COMBINING AT LEAST TWO IMAGES TO FORM A PANORAMIC IMAGE

(75) Inventor: Florian Gagel, Uhldingen-Muehlhofen (DE)

(73) Assignee: Diehl BGT Defence GmbH & Co. KG, Nuernberg (DE)

( * ) Notice: Subject to any disclaimer, the term of this patent is extended or adjusted under 35 U.S.C. 154(b) by 382 days.

(21) Appl. No.: 13/475,466

(22) Filed: May 18, 2012

(65) Prior Publication Data

US 2012/0229597 A1 Sep. 13, 2012

Related U.S. Application Data

(63) Continuation of application No. PCT/EP2010/006764, filed on Nov. 6, 2010.

(30) Foreign Application Priority Data

Nov. 21, 2009 (DE) .......................... 10 2009 054 251

(51) Int. Cl.
*H04N 7/00* (2011.01)
*H04N 13/02* (2006.01)
*G06T 3/40* (2006.01)
*G06T 15/20* (2011.01)

(52) U.S. Cl.
CPC ............. *G06T 3/4038* (2013.01); *G06T 15/205* (2013.01)

(58) Field of Classification Search
CPC .................................................. H04N 5/23238
See application file for complete search history.

(56) References Cited

U.S. PATENT DOCUMENTS

| 5,920,657 | A  | * | 7/1999  | Bender et al. .................. 382/284 |
| 6,665,003 | B1 | * | 12/2003 | Peleg et al. ..................... 348/36 |
| 7,010,158 | B2 |   | 3/2006  | Cahill et al. |
| 2005/0117215 | A1 | * | 6/2005 | Lange ............................ 359/462 |
| 2009/0100379 | A1 | * | 4/2009 | Borchers et al. .............. 715/851 |
| 2009/0138233 | A1 | * | 5/2009 | Kludas et al. ................. 702/158 |

OTHER PUBLICATIONS (By Paul E. Debevec, Camillo J. Taylor, Jitendra Malik, "Modeling and Rendering Architecture from Photographs: A hybrid geometry- and image-based approach", 1996, Computer Graphics, Annual Conference Series, ACM SIGGRAPH, pp. 11-20).*
Kang, et al., "3-D Scene Data Recovery using Omnidirectional Multibaseline Stereo", 1996, pp. 364-370, XP000640255.

* cited by examiner

*Primary Examiner* — Joseph Ustaris
*Assistant Examiner* — Zhubing Ren
(74) *Attorney, Agent, or Firm* — Laurence A. Greenberg; Werner H. Stemer; Ralph E. Locher

(57) ABSTRACT

In order to make it possible to reduce stereographic disturbances without image processing methods, it is proposed that pixels in the images each be associated with a distance from a distance model. The distance is an assumed distance from an object, which is imaged at that pixel, to at least one predetermined point, the distance model associates the distance in dependence on the position of the pixels in the recorded image. The image fusion is carried out using the associated distances.

20 Claims, 2 Drawing Sheets

METHOD AND DEVICE FOR COMBINING AT LEAST TWO IMAGES TO FORM A PANORAMIC IMAGE

CROSS-REFERENCE TO RELATED APPLICATION

This is a continuation application, under 35 U.S.C. §120, of copending international application No. PCT/EP2010/006764, filed Nov. 6, 2010, which designated the United States; this application also claims the priority, under 35 U.S.C. §119, of German application DE 10 2009 054 251.5, filed Nov. 21, 2009; the prior applications are herewith incorporated by reference in their entirety.

BACKGROUND OF THE INVENTION

Field of the Invention

The invention relates to a method for image fusion of at least two images to form a panoramic image.

In the case of warning and surveillance appliances which use a plurality of spatially distributed cameras as sensors, in order to provide an operator with a panoramic image or an all-round view of the situation, the problem of parallax shifting occurs: a physical object in the overlap area of two spatially separated cameras appears at different angles therein. The effect disappears in the far field and becomes greater the closer the object is and the larger the stereobase is, in the case of two sensors.

One simple solution to this problem is for separate individual representations to be presented alongside one another, thus forming an interrupted panoramic representation. An uninterrupted panoramic image can be obtained while using complex image processing methods, in which image contents represented on two images are identified as the same image contents, and are superimposed to form one image.

SUMMARY OF THE INVENTION

It is accordingly an object of the invention to provide a method and a device for combining at least two images to form a panoramic image which overcome the above-mentioned disadvantages of the prior art methods and devices of this general type, which allows the panoramic image to be produced in a simple manner and contains the image content of a plurality of individual images.

The object is achieved by a method for image fusion of at least two images to form a panoramic image, in which, according to the invention, pixels in the images are each associated with a distance from a distance model, the distance is an assumed distance from an object, which is imaged at that pixel, to at least one predetermined point, the distance model associates the distance as a function of the position of the pixels in the recorded image, and the image fusion is carried out using the associated distances.

The invention is in this case based on the following idea: in order to obtain a realistic representation in a panoramic representation, the entire representation should be formed as it would be seen by an observer from a single position. This position need not correspond to the position of an imaging camera. When a plurality of cameras record the individual images from different recording positions, the observer position cannot match the position of all the imaging cameras. The representations in the individual images must therefore be converted from the camera view to the observer view.

In order to produce a realistic and continuous panoramic representation and not just a sequence of individual images from the individual images, a unique angle with respect to the observer position must therefore be associated with each object represented. This can be done by means of numerical calculation, provided that the observer position, the relative position of the cameras with respect thereto, and the distance between the imaged object and the cameras are known. If the recording positions are known, the required angles can be determined easily. However, in general, the distance between an imaged object and the imaging camera is unknown.

The intrinsically unknown distance can be replaced by model assumptions, by the introduction of a distance model. If the distance is effectively known in this way, each pixel from one image can be associated with one pixel in the other image in the overlap area of two images. These two pixels, which are associated with one another in this way, can be linked to form a single pixel in the panoramic representation. To the extent that the distance model matches reality, stereographic disturbances can be reduced, and a continuous panoramic image can be produced from the images.

The distance model should reflect the imaged reality as well as possible. This can be achieved with greater or lesser difficulty depending on the topography being imaged. It is simplest if the topography is known, since the distance model can then be formed easily, since it is possible to know what topographical point is being imaged for each pixel. The distance model therefore reflects the topography of the imaged surrounding area.

However, if the cameras are fitted to a moving vehicle and the surrounding area is unknown, then the association between a pixel and the topographical point is also unknown. However, the approach using the distance model is nevertheless worthwhile in this case if the topography can be reflected to a satisfactory extent in a simple model. For example, this may be the case at sea or on a flat landscape, since at least essentially planar topography can be assumed there. Because of the known height of the camera above the ground or the water, the distance to the object being imaged in the pixel can be deduced from the elevation angle of a viewing direction or of a pixel in the image. If an imaged object has a greater extent in the elevation direction, for example as is the case with a large ship or marine vessel nearby, then a lower edge of the object can expediently be determined, and the distance to the entire object, and therefore to all pixels which image it can be set to this distance, even if their elevation angle is less.

The optical sensors which record the images, referred to for the sake of simplicity in the following text and without any restriction associated therewith as cameras, are at a distance from one another. They record the surrounding area in a different perspective. With reference to the panoramic image, the two images are therefore arranged alongside one another. They may partially overlap. The images can be reduced to image data and need not be displayed in a visible form.

In the following text, therefore, image data which represents an image of the surrounding area is also referred to as an image. The panoramic image can therefore be composed from the image data or two image data records, which could each themselves be assembled to form an image.

The panoramic image may be a 360° all-round view which was produced, in particular, using images from more than two cameras, each at a distance from one another. The predetermined point is expediently the observer position from which the panoramic image is intended to appear as having been viewed. A pixel may be a pixel of a digital image sensor in a camera, although a coarser and in particular a finer subdivision is also worthwhile, since the pixel in one image generally does not coincide precisely with that pixel in the other image which corresponds on the basis of the distance information. The distance is advantageously the distance from the object imaged in the pixel to the predetermined point, in particular to the position of the fictional observer, from whose view the panoramic image is intended to be shown.

In one advantageous embodiment of the invention, the pixels in the two images which are combined to form one pixel in the panoramic image are those which are associated with the same distance. This makes it possible to largely avoid disturbing stereographic effects.

It is also advantageous to use the azimuth angle of the pixels as information for combination of two pixels. This makes it possible to calculate a horizontal overlap distance for the two images for each pixel, and therefore an association between two pixels. The azimuth angle is expediently related to a previously defined direction.

Voxels, each having three-dimensional spatial information, can be produced from the pixels in the two images. The two-dimensional spatial information which can be associated with each pixel from its position in the image and the known alignment in the imaged space may in this case have the distance information added to it, thus resulting in one voxel in each case with three-dimensional spatial information relating to the position of the respectively imaged object in the space relative to a reference point. If those voxels having the same spatial information are now combined to form in each case one pixel in the panoramic image, then a panoramic image with minor imaging errors can be produced by such image fusion. The spatial information in this case expediently contains the spatial coordinates of a viewing point, or of an object imaged by the pixel, in a topography from the view from the predetermined point.

Good monitoring of a relatively large object, for example of a marine vessel, can be achieved by recording the at least two images from different points. It is also advantageous for the image areas of the at least two images to partially overlap.

A further advantageous refinement of the invention provides that the distance model originates from a known topography of the surrounding area represented in the images. This makes it possible to associate a point in the topography, and therefore a distance and in particular an item of three-dimensional spatial information, with each pixel, which expediently images a recorded solid-angle range. The distance model is particularly simple and image fusion is therefore reliable, if the distance model is based on a view of a planar surface. The distance model therefore advantageously originates from the assumption of the reduction in the capability of an imaged object to be positioned in a two-dimensional topography whose shape can form the basis of the distance model.

The distance can be determined trigonometrically from in each case one physical recording point of the images, the predetermined point and the position of the pixels. If the topography is known, or is assumed to be known, the distance can be determined on the basis of the position of the pixels in the recorded images and their viewing point into the topography on the basis of the known alignment of the images in this topography.

If the alignment of the images in the topography is not known, or is not known sufficiently accurately, an alignment of the images in the topography can be determined on the basis of image information by image processing. For example, a horizon can thus be identified in the image, and the elevation alignment of the images can be determined in this way. The identification of the horizon is sufficient for image fusion if the two or more cameras are moved synchronously, for example on a marine vessel, such that their recording directions always remain unchanged with respect to one another.

Additionally or alternatively, an alignment of the images in the topography can be determined on the basis of a position sensor for determination of the position of the cameras recording the images. Rapid changes in the viewing direction can be detected easily in this way.

The predetermined point may be the position of a virtual observer from which the panoramic image appears to be viewed. Clear monitoring can be achieved if the predetermined point can be changed by an operator, and the panoramic image is recomposed from the images, corresponding to the new point. The operator can therefore make a virtual tour around an object, for example a marine vessel, and thus obtain a realistic overview of the surrounding area. This can be done by moving the predetermined point around an object and by the panoramic image corresponding to a field of view, in particular a continuously changing field of view, of a virtual observer who is moving around the object and, for example, is looking radially outwards.

The panoramic image may have a different, for example higher, image resolution than the two images in order, for example, to make it possible to resolve well between two pixels which are not precisely superimposed. It is furthermore advantageous if the at least two images are recorded at the same time by at least two cameras.

Despite the image fusion and the continuous representation of the surrounding area in the panoramic image, it is impossible to avoid imaging errors which occur as a result of an object being recorded from two different perspectives. For example, a marine vessel which is imaged in both images will be represented on the one hand obliquely from the side and on the other hand entirely from the side. The corresponding pixels are admittedly fused such that each point on the object, for example a bull's eye on the imaged marine vessel, is imaged only once in the panoramic image, but the perspective difference between, for example, edges which can be seen in one image and cannot be seen in the other image cannot be eliminated. It is therefore possible for the imaged object or the represented object not to be represented in a focused form, or not to be possible to see its details as well.

This disadvantage can be overcome if the object which is represented in an overlap area of the two images is represented in the panoramic image from the perspective of only one of the images. This simplified representation is expediently carried out in response to a command from an operator who can select from the cameras used that camera whose image content is intended to be used as the sole representation.

There are a plurality of options for this method. It is simple for the entire overlap area to be represented by the representation from only one camera. The image fusion is therefore stopped at least for this area, and a clear representation is obtained at the expense of the continuity of the panoramic representation. The operator can therefore achieve clarity over an object of interest. An interruption in the continuity of the panoramic representation can be avoided if the object of interest can be selected without its surrounding area, for example by a mouse on a screen and supporting image processing, and only the image area of this object being excluded from the image fusion.

The operator can advantageously switch backward and forward between image fusion and interruption of the image fusion—in its entirety or in places—thus allowing him to view an object in more detail when required, while essentially maintaining the panoramic view. If the perspective from which the object is represented in the panoramic image can be changed from the perspective of one image to the perspective of the other image, then the operator can select the object from two different perspectives, and can select the more suitable perspective.

The invention also relates to an apparatus for image fusion having at least two cameras, which are at a distance from one another, for recording a surrounding area from different perspectives, an image display for displaying a panoramic image, and a process device which is configured to fuse an image from a camera with an image from the other camera to form a panoramic image, with pixels in the two images each being associated with a distance from a distance model, with the distance being an assumed distance from an object, which is imaged at that pixel, to at least one predetermined point, with the distance model associating the distance as a function of the position of the pixels in the recorded image, and with the image fusion being carried out using the associated distances.

The process device is advantageously configured to control the conduct of any desired, a plurality of desired or all of the abovementioned method steps. A design such as this can be achieved by an appropriate control program for the process device, whose running—for example in conjunction with suitable input signals, such as sensor signals,—results in such control. For this purpose, the control device expediently contains electronic elements, such as a processor and a data memory, which are required for running the control program.

Objects of interest can be reliably identified as such from the panoramic image, for example a boat on a collision course. The process device is advantageously configured to identify such objects, to select a suitable camera, and to direct it at the object.

Further advantages will become evident from the following description of the drawing, which illustrates exemplary embodiments of the invention. The drawing and the description contain numerous features in combination, which a person skilled in the art will also expediently consider individually, and combine to form worthwhile further combinations.

Other features which are considered as characteristic for the invention are set forth in the appended claims.

Although the invention is illustrated and described herein as embodied in a method and a device for combining at least two images to form a panoramic image, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
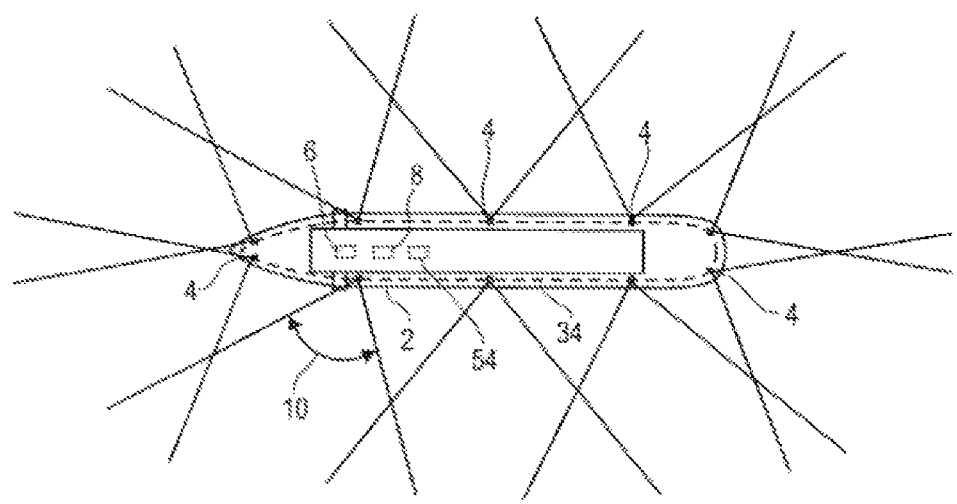
FIG. 1 is a diagrammatic, plan view of a marine vessel having ten cameras, which ensure a view all round the marine vessel according to the invention.

Referring now to the figures of the drawing in detail, and first to FIG. 1, there is shown a schematic plan view of a relatively large ship 2, which is equipped with ten cameras 4, a processing device 6 and an image display 8. Each of the cameras 4 has a viewing area 10, with each viewing area 10 overlapping the two adjacent viewing areas 10, thus allowing a view all round the marine vessel 2, from a certain distance away from the marine vessel 2. Any other vehicle, building or object is possible, instead of the marine vessel 2.

Figure 2:
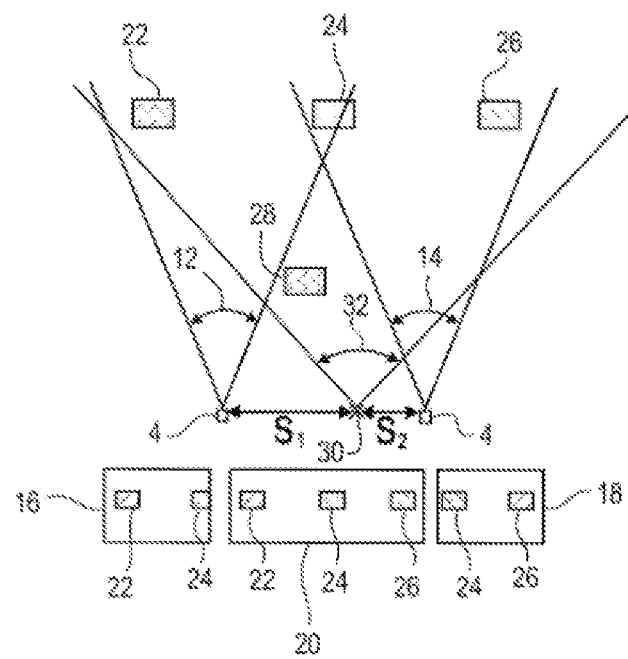
FIG. 2 is a schematic illustration of viewing areas of two cameras and a virtual viewing area.

FIG. 2 shows two viewing areas 12, 14 of two of the ten cameras 4 shown in FIG. 1. The following text applies equally to the other cameras 4 shown in FIG. 1. An image 16, 18 is in each case created from data from the two cameras 4, with the aid of the processing device 6, and is fused to form a panoramic image 20. The images 16, 18 are not displayed per se, and are restricted to image data from the two cameras 4. The panoramic image 20 is made visible on the image display 8, thus allowing an operator to use the panoramic image 20 to monitor the area around the marine vessel 2.

Four objects 22, 24, 26, 28 are located in the vicinity of the marine vessel 2. The object 22 is imaged completely in the image 16, and the object 24 is imaged only partially. The objects 24 and 26 are imaged in the image 18, and the object 28 is not imaged, and therefore cannot be seen by the operator.

The panoramic image 20 shows the surrounding area with the objects 22, 24, 26 as would be displayed to an observer who is located at a predetermined point 30. The observer likewise has a viewing area 32, which extends over the viewing areas 12, 14 of the two cameras 4. Generalized to all ten cameras 4 shown in FIG. 1, the viewing area 32 of the panoramic image 20 could extend through 360°, all round the marine vessel 2. The point 30 is at the known distances $S_1$ and $S_2$ from the two cameras 4. The point 30 and therefore the distances $S_1$ and $S_2$ can be set, within predetermined limits, by an operator on the image display 8. By way of example, the point 30 can be moved virtually on a path 34 around the marine vessel and around marine-vessel fittings. This can be done using an adjustment device, for example a slide, along a mechanical path, or a mouse on a screen. Depending on the selected position, the panoramic image 20 is calculated by the process device 6, and is displayed on the image display 8.

A distance model which associates a defined point in three-dimensional space with each pixel of each image 16, 20 is used for fusion of the two images 16, 18 to form the panoramic image 20. The coordinates of the three-dimensional space may be related to a fixed point on the marine vessel 2, and may be calculated further, with the aid of a coordinate transformation process, to the coordinates of the point 30 predetermined by the operator. The distance model is based on the assumption of reducing the capability to position an imaged object 22, 24, 26 in a two-dimensional landscape or topography whose shape forms the basis of the distance model. A location or viewing point in the landscape can thus be associated with every pixel in each image 16, 18. Without the distance model, one viewing line would be associated with each pixel. The predetermined topography of the distance model reduces the possible position of the imaged object 22, 24, 26 to the intersection of the viewing line with the topography, and therefore to a unique point, which can be provided with specific three-dimensional coordinates. Each pixel of the image 16, 18 therefore becomes a voxel whose three-dimensional coordinates are defined.

This model will be explained in the following text with reference to FIGS. 3 and 4. A camera 4 on the marine vessel 2 faces a planar surface 36, for example the sea. There are two objects 22, 24 on the surface 36. The view of the objects 22, 24 in each case defines a viewing line 38, 40, whose elevation angles $\alpha_1$ and $\alpha_2$ and azimuth angles (this is admittedly not shown in FIG. 2, but it can be seen) define the position of the imaged object 22, 24 in the image 16. Each viewing direction 38, 40 is uniquely defined by the elevation angles $\alpha_1$ and $\alpha_2$ and the azimuth angle.

Figure 4:
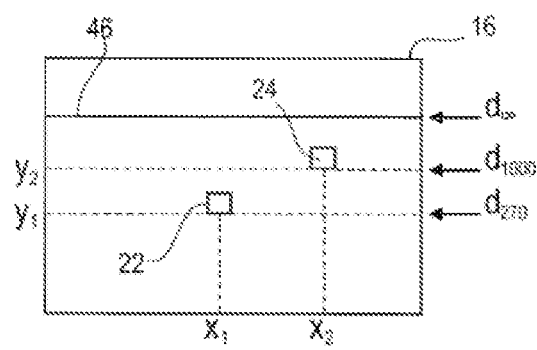
FIG. 4 is a schematic illustration of an image of a camera, and of two objects represented therein.

FIG. 4 shows a schematic illustration of the objects 22, 24 as they would be seen in the image 16 if this were displayed on the image display 8. Image coordinates $x_1$, $y_1$ and $x_2$, $y_2$ are associated with each object 22, 24, and the viewing line to the objects 22, 24 can be determined from these.

Figure 3:
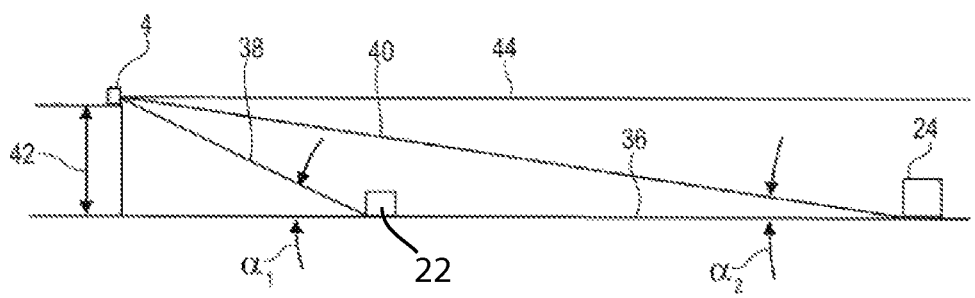
FIG. 3 is a schematic illustration of the viewing areas from FIG. 2, from the side.

The distance model adds the topography to this data, or an assumption of a topography, the planar surface 36 in the example shown in FIG. 3, which in reality, as the sea or a landscape level, may differ from the exact planar surface. With the aid of the known position of the camera 4 with respect to the topography, a known height 42 above the plane 36 in the example shown in FIG. 3, every viewing line 38, 40 can be associated with an intersection with the topography, whose position coordinates are uniquely defined. The intersection of the horizontal viewing line 44 with the topography is located at infinity. In the image, the horizon is assumed to be an infinite distance away, thus providing a correction for the horizontal viewing line 44 by image processing when the horizon can be seen.

The distance $d_{270}$=270 m to the recording camera 4 is associated with the object 22, and the distance $d_{1000}$=1000 m to the recording camera 4 is associated with the object 24, on the basis of the distance model and the topography, which is assumed to be known. By way of example, if the topography is flat, the elevation angles $\alpha_1$ and $\alpha_2$ can be used to determine the distance d using the relationship d=h/sin q, where h is the height 42. The distance $d_\infty$=infinity is associated with the horizon 46 which can be seen in the image 16. The physical position of the objects 22, 24 relative to the recording camera 4 is known from this and from the azimuth angle.

The known relative position of the point 30, which is defined by the operator, with respect to the recording camera 4 makes it possible to determine the relative position of the objects 22, 24 with respect to the point 30 by simple coordinate transformation, and to determine its position in the panoramic image 20, by simple trigonometry.

Two pixels are assigned to each point in the surrounding area in the area in which the two images 16, 18 overlap, specifically a pixel in one image 16 and a further pixel in the other image 18. These two corresponding pixels have the same position coordinates with respect to the point 30. They are therefore imaged superimposed in the panoramic image 20. This can be achieved by weighted gray-scale averaging, as a result of which a relatively light pixel and a relatively dark pixel result in a pixel of medium brightness. Instead of imaging the two corresponding pixels in one pixel in the panoramic image 20, this can be resolved more finely, thus making it possible to take account of the two corresponding pixels not overlapping completely. It is also possible to display only parts of the panoramic image, rather than the entire panoramic image.

Figure 5:
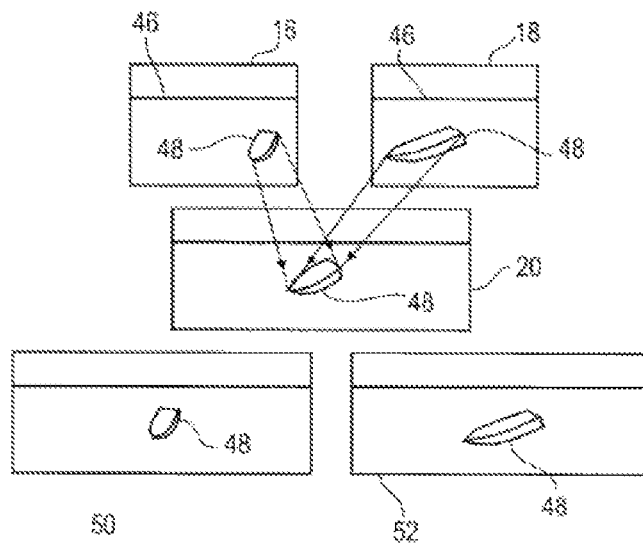
FIG. 5 is an illustration of two images from two cameras on a boat, and three panoramic images fused from the two images.

FIG. 5 will be referred to in the following text to explain how a problem resulting from this image fusion can be solved. The two images 16, 18 show a boat 48, or some other object, in the form of two different perspective representations. The resultant panoramic representation 20 shows the boat 48 from the perspective at the point 30 which, as is illustrated in FIG. 2, is located between the two cameras 4 which record the two images 16, 18, expediently at the same time.

Depending on the perspective, it is possible for one object 22, 24, 26, such as the boat 48, to be recorded from one side in one image and from the other side in the other image. The image fusion admittedly organizes each point in the overlap area of the images correctly in the panoramic image, as is indicated by the arrows in FIG. 5, but nevertheless a view from the point 30 of the boat 48 would show this either from one side or from the other. The fusion process would therefore have to dispense with representation of the side which cannot be seen, and this requires complex image processing. Without this, it is possible for an object 22, 24, 26 to be represented in the panoramic image 20 in a manner which makes it difficult to identify.

If the operator has the option of being able to view the overlap area or only the area around the boat 48 either from the perspective of one camera 4 or from the other camera as is shown in the panoramic images 50 and 52, it is possible to image the boat in a focused form in the panoramic image 20. The continuity of the panoramic image 20 is admittedly then interrupted at this point, but this may be accepted, for detailed representation purposes. For this purpose, the data processing program by which the processing device 6 creates the panoramic image 20 is equipped with a function which allows the operator to select from the recorded view the boat 48 or an area selected by the operator, expediently such that the operator can switch from one view to the other view. If this detail is considered sufficient, it is possible to change back from the detailed mode to the panoramic mode.

The basis for the use of the distance model is that the alignment of the cameras 4 into the topography and the images in the topography are known. In the case of a marine vessel whose position is fluctuating, this basis can be obtained from the marine-vessel movements. However, the alignment of the cameras 4 recording the images 16, 18 can be determined on the basis of a position sensor 54 (FIG. 1), which registers the movements of the marine vessel 2, and therefore those of the cameras 4, and passes the appropriate data to the process device 6. This uses the sensor data to calculate the alignment of the cameras 4 relative to the topography, and therefore the coordinates of the pixels in the topography.

In order to avoid drift, which produces errors, in the alignment determination, the alignment of the cameras 4 can additionally or alternatively be determined on the basis of image information, by image processing. If an object is imaged and identified whose position in space is known, such as the horizon 46, then the alignment of the camera 4 can be determined on the basis of the image data of this object.

One additional advantage when using image processing in addition to the use of the distance model is that extended objects can be identified as such. For example, the boat 48 covers an elevation angle range which, if the distance model were to be used on its own, would lead to the upper part of the boat being assumed to be further away than the lower part. If the object is identified as such, the distance can be determined from a lower pixel of the object or from its lower edge, in which case, for example, the same distance can be associated with all the pixels of the object above this.

In the case of a marine vessel 2 whose position is fluctuating, it may be worthwhile including the marine-vessel movement in the representation of the surrounding area, in such a way that the image area of the panoramic image 20 also fluctuates corresponding to the marine-vessel movement. This makes it possible to reduce a contradiction between visual information and equilibrium information in the brain of the observer or operator, and to counteract nausea. Expediently, it is possible to select and switch between a stabilized virtual representation and a virtual representation carrying out the marine-vessel movement.

The steps of image fusion allow the positions of objects 22, 24, 26 with respect to a camera 4 and with respect to the marine vessel 2 to be identified well. If an object 22, 24, 26 is of particular interest, for example because it is on a collision course with the marine vessel 2, then the position coordinates of the object 22, 24, 26 can be used to control one or more cameras 4 with the aid of the image fusion data, and to align them with the object 22, 24, 26, such that an operator can see the object 22, 24, 26 without it being imaged at an area of the panoramic image 20 where there is no image intersection. This allows an object 22, 24, 26 of interest to be imaged focused and without errors, and thus to be observed in detail. For this purpose, the process device 6 identifies the position coordinates of the objects 24 imaged in an overlap area, and controls the cameras such that they are moved out of the overlap area.

The invention claimed is:

1. A method for image fusion of at least two images for forming a panoramic image, which comprises the steps of:
   providing a processing device, the processing device performing the further steps of:
      associating pixels in the two images each with a distance from a distance model, the distance is an assumed distance from an object, being imaged at a pixel, to at least one predetermined point, the distance model associating the distance in dependence on a position of the pixels in the images resulting in associated distances, wherein the distance model assumes an at least generally planar topography, such that, because of a known height of a camera above the planar topography, the distance to the object being imaged at the pixel can be deduced from an elevation angle of the pixel in the image, wherein the pixels in the two images which are combined to form one pixel in the panoramic image are those which are associated with a same distance; and
      carrying out the image fusion using the associated distances.

2. The method according to claim 1, which further comprises using an azimuth angle of the pixels as information for combining the two pixels.

3. The method according to claim 1, which further comprises:
   producing voxels, each having three-dimensional spatial information, from the pixels in the two images; and
   combining the voxels having a same spatial information to form one pixel in the panoramic image.

4. The method according to claim 3, wherein the spatial information contains spatial coordinates of a viewing point in a topography from a view from the predetermined point.

5. The method according to claim 1, which further comprises recording the at least two images from different points.

6. The method according to claim 1, wherein image areas of the at least two images partially overlap.

7. The method according to claim 1, wherein the distance model originates from a known topography of a surrounding area represented in the two images.

8. The method according to claim 1, wherein the distance model originates from an assumption of a reduction in a capability of the object imaged to be positioned in a two-dimensional topography whose shape forms a basis of the distance model.

9. The method according to claim 1, which further comprises determining the distance trigonometrically from in each case one physical recording point of the images, the predetermined point and the position of the pixels.

10. The method according to claim 1, which further comprises determining the distance on a basis of a position of the pixels in the images recorded and their viewing point into a known topography on a basis of a known alignment of the images in the known topography.

11. The method according to claim 1, which further comprises determining an alignment of the images in a topography on a basis of image information by image processing.

12. The method according to claim 1, which further comprises determining an alignment of the images in a topography on a basis of a position sensor for determination of an alignment of cameras which record the images.

13. The method according to claim 1, wherein the predetermined point is a position of a virtual observer from which the panoramic image appears to be viewed.

14. The method according to claim 1, which further comprises changing the predetermined point by an operator, and the panoramic image is recomposed from the images, corresponding to a new point.

15. The method according to claim 14, which further comprises moving the predetermined point around an object, and the panoramic image corresponds to a changing field of view of a virtual observer who is moving around the object.

16. The method according to claim 1, which further comprises forming the panoramic image with a different image resolution than the two images.

17. The method according to claim 1, which further comprises recording the at least two images at a same time by at least two cameras.

18. The method according to claim 1, wherein the object, which is represented in an overlap area of the two images in the panoramic image is represented only from a perspective of one of the images.

19. The method according to claim 18, wherein a perspective from which the object is represented in the panoramic image is changed from a perspective of the one image to a perspective of the other image.

20. An apparatus for image fusion, comprising:
   at least two cameras spaced at a distance from one another, for recording a surrounding area from different perspectives;
   an image display for displaying a panoramic image; and
   a processing device for fusing an image from a first of said cameras with an image from a second of said cameras to form the panoramic image, with pixels in the two images each being associated with a distance from a distance model, with the distance being an assumed distance from an object, being imaged at the pixel, to at least one predetermined point, with the distance model associating the distance in dependence on a position of the pixels in the image recorded, wherein the distance model assumes an at least generally planar topography, such that, because of a known height of said cameras above the planar topography, the distance to the object being imaged at the pixel can be deduced from an elevation angle of the pixel in the image, wherein the pixels in the two images which are combined to form one pixel in the panoramic image are those which are associated with a same distance, and with the image fusion being carried out using the associated distances.

* * * * *